(12) United States Patent
Fleming

(10) Patent No.: US 7,926,784 B2
(45) Date of Patent: Apr. 19, 2011

(54) CONTROL VALVE TRIM AND SEAL

(75) Inventor: Leslie E. Fleming, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 548 days.

(21) Appl. No.: 11/972,978

(22) Filed: Jan. 11, 2008

(65) Prior Publication Data
US 2009/0179163 A1 Jul. 16, 2009

(51) Int. Cl.
*F16K 47/08* (2006.01)

(52) U.S. Cl. ........ 251/282; 251/325; 251/334; 277/395; 277/530

(58) Field of Classification Search .......... 251/214, 251/282, 325, 332, 333, 334, 318; 277/395, 277/529, 530
See application file for complete search history.

(56) References Cited

U.S. PATENT DOCUMENTS

| | | | | |
|---|---|---|---|---|
| 3,722,860 A | * | 3/1973 | Curran | 251/332 |
| 3,805,839 A | * | 4/1974 | Baumann | 137/625.35 |
| 4,293,116 A | * | 10/1981 | Hinrichs | 251/173 |
| 4,750,708 A | * | 6/1988 | Yusko et al. | 251/315.13 |
| 5,722,637 A | * | 3/1998 | Faramarzi et al. | 251/190 |
| 6,851,658 B2 | * | 2/2005 | Fitzgerald et al. | 251/282 |
| 6,932,321 B2 | * | 8/2005 | Baumann | 251/214 |
| 2003/0197144 A1 | | 10/2003 | Nguyen | |
| 2005/0230652 A1 | * | 10/2005 | Anderson et al. | 251/214 |
| 2009/0179169 A1 | | 7/2009 | Fleming | |

FOREIGN PATENT DOCUMENTS

EP 0 675 304 A 10/1995

OTHER PUBLICATIONS

International Search Report for PCT/US2008/086341, mailed Mar. 26, 2009.

* cited by examiner

*Primary Examiner* — John Bastianelli
(74) *Attorney, Agent, or Firm* — Marshall, Gerstein & Borun LLP

(57) ABSTRACT

A fluid control device comprises a valve body, a valve plug, a valve cage, and a sealing ring. At least a portion of the sealing ring is disposed within a gap between the valve plug and the valve cage to provide a seal therebetween when the valve plug is in the closed position. The sealing ring includes an L-shaped cross-section that provides an effective seal regardless of the port diameter of the fluid control device, and thus, reduces the number of types of seals required to be stored in inventory for various applications.

20 Claims, 3 Drawing Sheets

CONTROL VALVE TRIM AND SEAL

FIELD OF THE INVENTION

The present invention relates to control valves for controlling fluid flow, and more particularly, control valves including a valve plug movably disposed within a valve cage.

BACKGROUND

Typical fluid process control systems comprise various components for controlling various process parameters. For example, a fluid process control system may include a plurality of control valves for controlling flow rate, temperature, and/or pressure of a medium flowing through the system. The end product is dependent on the accuracy of the control of these parameters, which is, in turn, dependent on the geometry and characteristics of the control valves. For example, control valves are specifically designed and selected to provide for particular flow capacities and pressure changes. If and when these characteristics are compromised, the quality of the end product may be affected. One way such characteristics may be compromised is by inadvertent leakage of the process.

SUMMARY

One embodiment of the present invention includes a fluid control device comprising a valve body, a valve seat, a valve plug, a valve cage, and a sealing ring. The valve body includes an inlet port and an outlet port. The valve seat is disposed within the valve body and defines an opening fluidly communicating between the inlet port and the outlet port. The valve plug includes an external surface and is movable between a closed position and an open position. In the closed position, the valve plug engages the valve seat and forms a primary seal. In the open position, the valve plug is displaced from the valve seat. The valve cage is disposed within the valve body and includes an internal surface sized to receive the valve plug such that a gap between the valve cage and the valve plug defines a leak path. The sealing ring of the disclosed embodiment has a generally L-shaped cross-section. At least a portion of the sealing ring is disposed within the gap to provide a secondary seal sealing the leak path when the valve plug is in the closed position.

In at least one embodiment, the sealing ring comprises a flange portion and a resilient sealing band portion. The flange portion is secured to one of the valve cage and the valve plug. The resilient sealing band portion sealingly engages the internal surface of the valve cage and an external surface of the valve plug to provide the secondary seal when the valve plug is in the closed position.

DETAILED DESCRIPTION

Figure 1:
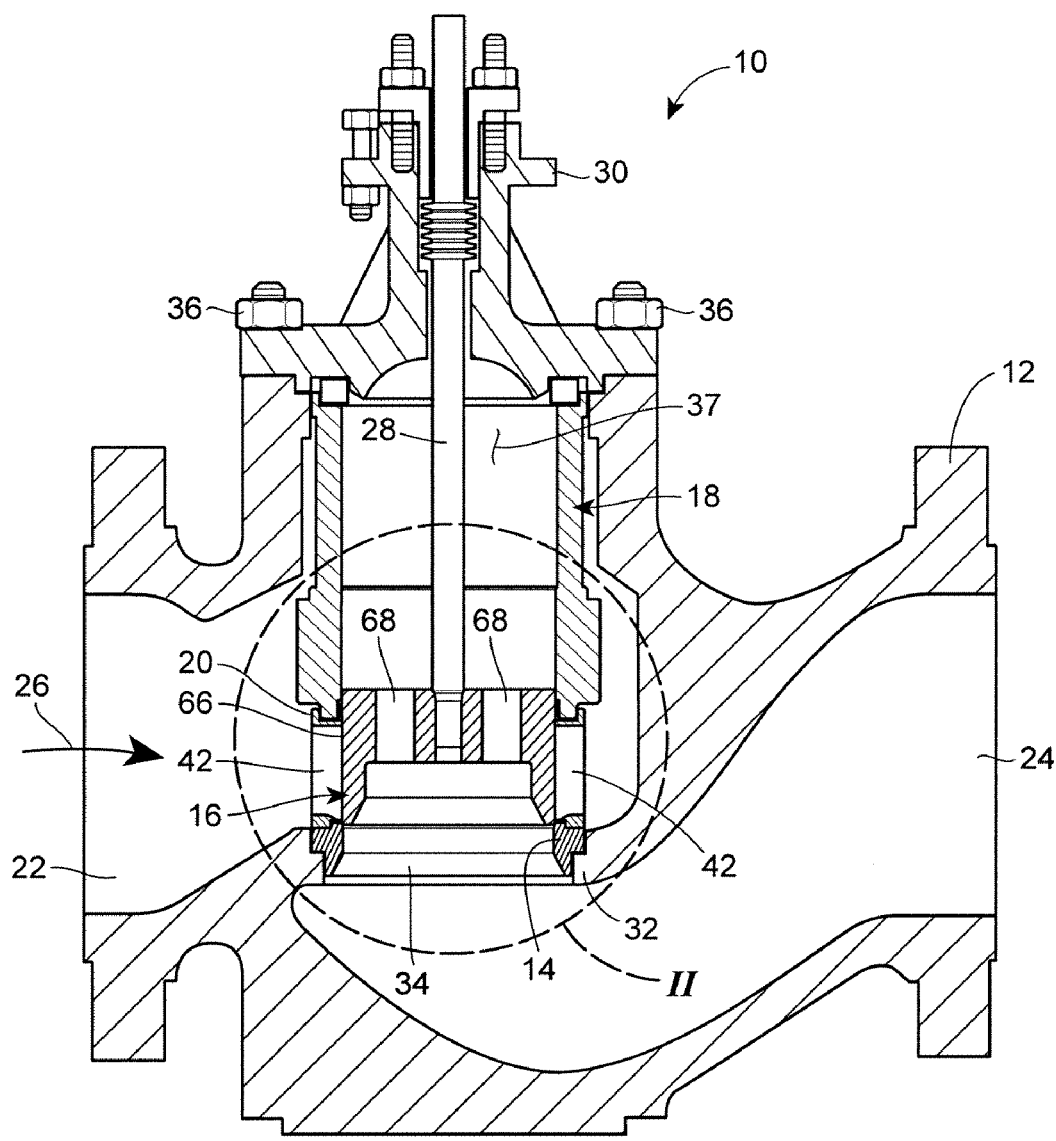
FIG. 1 is a cross-sectional side view of a fluid control device constructed in accordance with one embodiment of the present disclosure.
Figure 2:
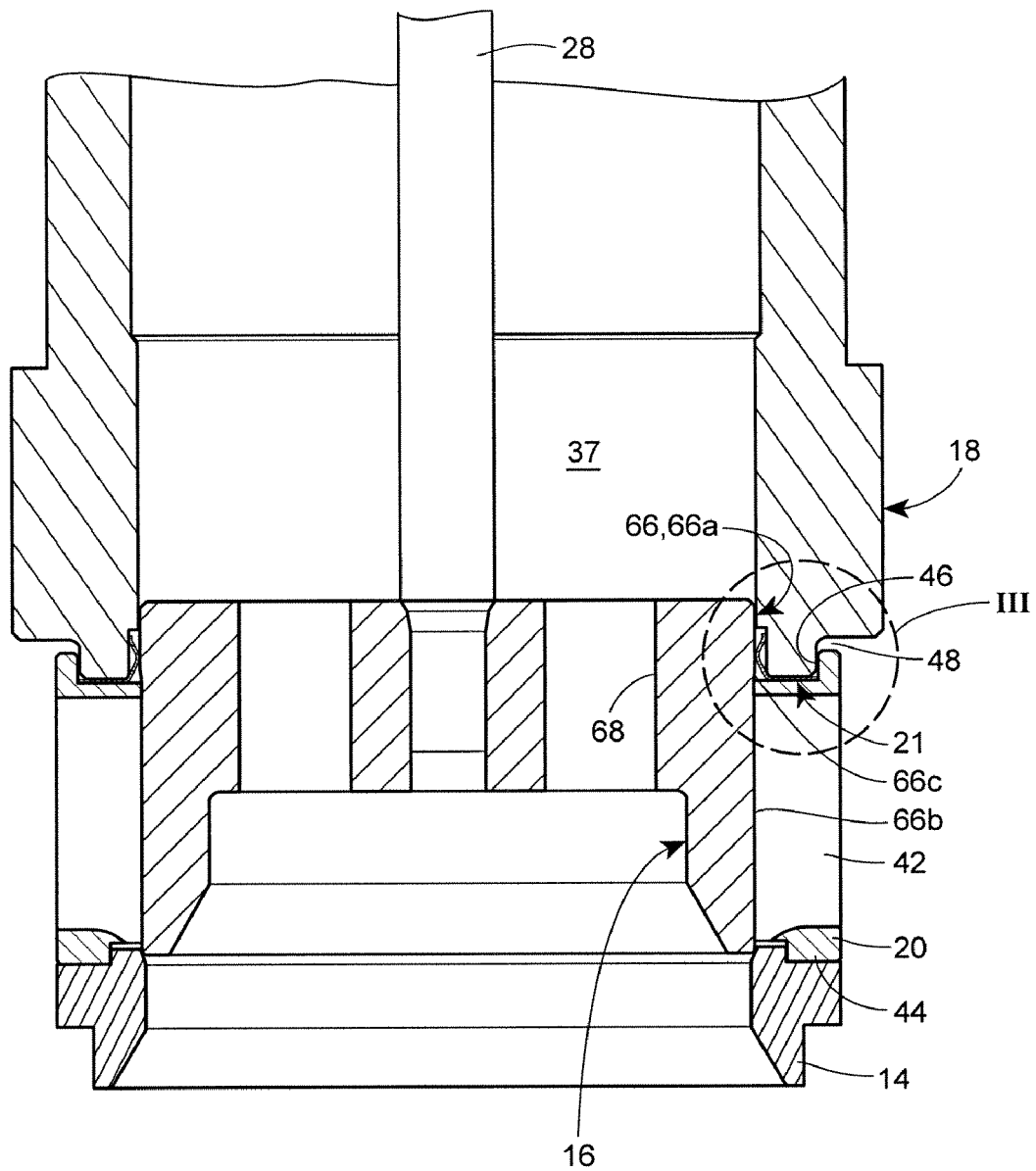
FIG. 2 is a partial cross-sectional side view of the fluid control device of FIG. 1 taken from circle II of FIG. 1.

FIG. 1 depicts one embodiment of a control valve 10 constructed in accordance with the principles of the present invention. The control valve 10 generally comprises a valve body 12, a bonnet 30, a cage retainer 18, a cage 20, a sealing ring 21 (shown in FIG. 2), a valve plug 16 and a valve seat 14. The valve body 12 defines an inlet port 22, an outlet port 24, and a fluid flow path 26 extending between the inlet port 22 and the outlet port 24. The valve plug 16 is coupled to the end of a valve stem 28, which extends through the bonnet 30 and is adapted to be coupled to an actuator (not shown). The actuator controls the displacement of the valve plug 16 between a closed position (shown in FIG. 1) in engagement with the valve seat 14 to define a primary seal and an open position (not shown) displaced from the valve seat 14. The sealing ring 21 provides a secondary seal between the cage retainer 18 and the cage 20. In the disclosed embodiment, the sealing ring 21 comprises a body having a generally L-shaped cross-section, as depicted in FIGS. 2 and 3 and described in more detail below.

With continued reference to FIG. 1, the valve seat 14 is carried within a throat portion 32 of the valve body 12 and defines an opening 34 in fluid communication with the fluid flow path 26. The cage retainer 18 is clamped into the valve body 12 by the bonnet 30, which is fixed to the valve body 12 with a plurality of fasteners 36. So configured, the cage retainer 18 clamps the cage 20 and valve seat 14 into the throat portion 32 of the valve body 12.

The cage 20 comprises a generally cylindrical member defining a plurality of windows 42 in fluid communication with the fluid flow path 26. Additionally, as illustrated in FIG. 2, the cage 20 includes a lower shoulder 44 seated against the valve seat 14 and an upper recess 46 receiving a portion of the sealing ring 21 and the cage retainer 18. Specifically, the upper recess 46 of the cage 20 receives a lower shoulder 48 of the cage retainer 18, which secures the sealing ring 21 to the cage 18. So disposed, the internal surface 37 of the cage retainer 18 defines an annular channel 50. In the disclosed embodiment, the annular channel 50 is disposed between the cage retainer 18 and the cage 20 and accommodates a portion of the sealing ring 21. In alternative embodiments, however, the annular channel 50 can be defined by either the cage retainer 18, the cage 20, or both.

Figure 3:
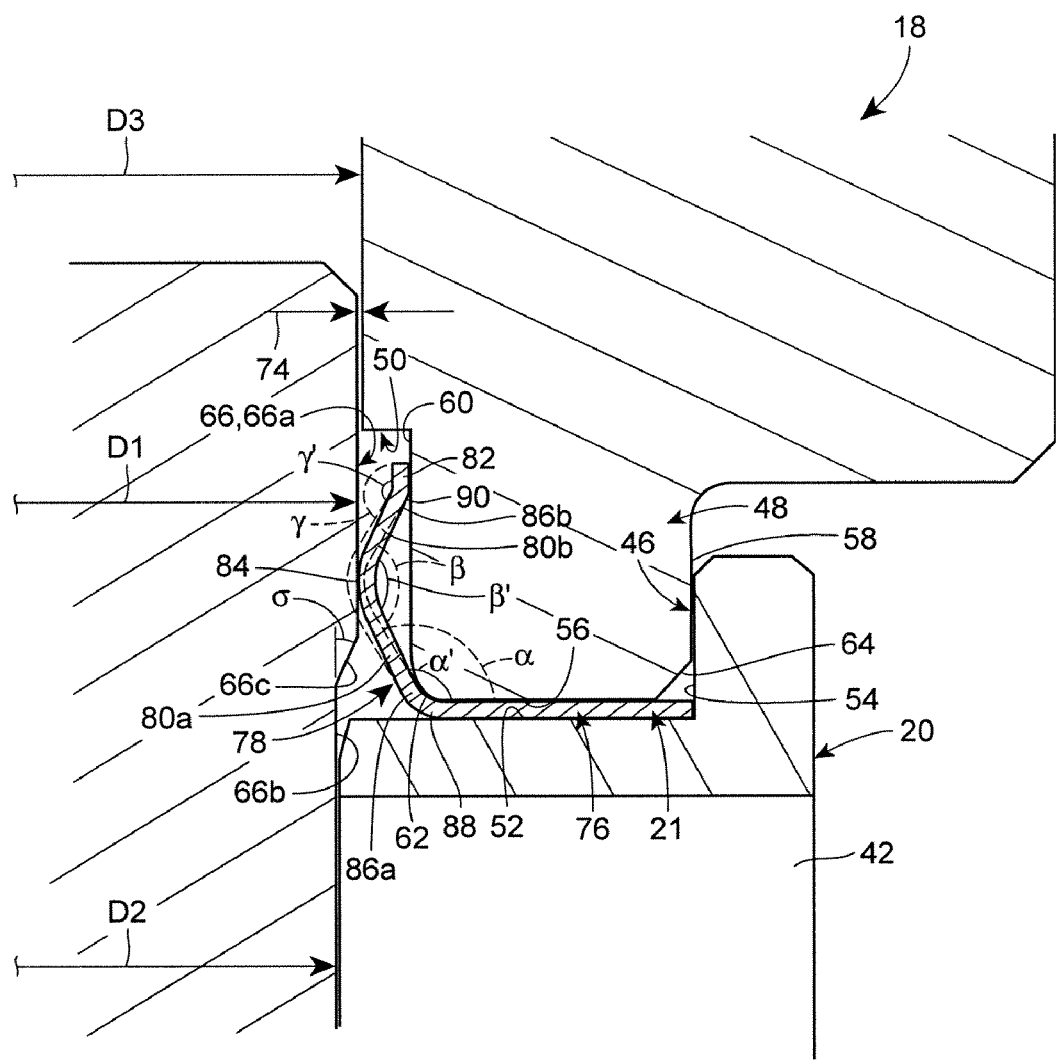
FIG. 3 is a detailed partial cross-sectional side view of the fluid control device of FIG. 2, taken from circle III of FIG. 2 and illustrating the flexible nature of a sealing ring of the device during operation.

As depicted in FIG. 3, the upper recess 46 of the cage 20 includes a bottom surface 52 and a side surface 54 disposed generally perpendicular to the bottom surface 52. The lower shoulder 48 of the cage retainer 18 defines a bottom surface 56, an external side surface 58, and an internal side surface 60. The external and internal side surfaces 58, 60 are disposed generally perpendicular to the bottom surface 56. The internal side surface 60 defines an external boundary of the annular channel 50. Additionally, the lower shoulder 48 of the cage retainer 18 comprises a bull-nosed corner 62 between the bottom surface 56 and the internal side surface 60, and a chamfered corner 64 between the bottom surface 56 and the external side surface 58.

As shown in FIG. 1, for example, the valve plug 16 of the disclosed embodiment comprises a balanced valve plug having an external surface 66 and a pair of through-bores 68. The through-bores 68 are in fluid communication with the fluid flow path 26 and a cavity 70 defined by the interior of the cage retainer 18. Accordingly, the pressure in the valve body 12 is balanced on both sides of the valve plug 16, even when the valve plug is in the closed position (shown in FIG. 1). As shown in FIG. 3, the external surface 66 of the valve plug 16 comprises a multi-contoured surface including a first perimeter surface 66a, a second perimeter surface 66b, and a transition surface 66c disposed between and connecting the first and second perimeter surfaces 66a, 66b.

As illustrated in FIG. 2, the first transition surface 66a includes a first diameter D1, and the second perimeter surface 66b includes a second diameter D2. The second diameter D2 is smaller than the first diameter D1. The transition surface 66c includes a generally frustoconical surface that converges from the first perimeter surface 66a to the second perimeter surface 66b. The transition surface 66c is disposed at an angle σ relative to the second perimeter surface 66b. The angle σ can be in the range of approximately ten degrees (10°) to approximately eighty degrees (80°), and in one embodiment, approximately thirty degrees (30°).

In one alternative embodiment, however, the transition surface 66c can include a rounded bull-nose type surface. In another alternative embodiment, the transition surface 66c can include a surface that is perpendicular to the first and second perimeter surfaces 66a, 66b. Such a configuration may not interfere with the movement of the valve plug 16 because the legs 80a, 80b of the sealing band portion 78 are disposed at angles, as described. As such, when the valve plug 16 moves from an open position to the closed position, for example, the sharp corner of the valve plug 16 that is located between the first perimeter surface 66a and the transition surface 66c would engage the second leg 80b of the sealing band portion 78. Further movement of the valve plug 16 in the downward direction would therefore compress the sealing band portion 78 until the first perimeter surface 66a became engaged with the peak 84.

Referring back to FIG. 1 and as mentioned above, the valve plug 16 is disposed within the cage retainer 18 and adapted for displacement between the closed position and one or more open positions. Accordingly, the internal surface 37 of the cage retainer 18 is sized and configured so as not to interfere with the movement of the valve plug 16. For example, as depicted in FIGS. 2 and 3, the internal surface 37 of the cage retainer 18 includes a diameter D3 that is larger than the diameters D1, D2 of the first and second perimeter surfaces 66a, 66b of the external surface 66 of the valve plug 16. So configured, a gap 74 exists between the cage retainer 18 and the valve plug 16, through which fluid in the flow path 26 and the cavity 70 of the cage retainer 18 can leak, especially from the cavity 70 to the windows 42 of the cage 20 when the valve plug 16 is in the closed position.

Therefore, the control valve 10 constructed in accordance with the principles of the present invention comprises the sealing ring 21 to seal the gap 74 and prevent leakage. As illustrated in FIG. 3, the sealing ring 21 comprises a one-piece member including a flange portion 76 and a resilient sealing band portion 78 disposed generally orthogonal to each other such that the sealing ring 30 has a generally L-shaped cross-section. In the disclosed embodiment of the sealing ring 21, the flange portion 76 extends generally radially outwardly from the sealing band portion 76. As shown in FIG. 3, the flange portion 76 is clamped between the bottom surface 52 of the upper recess 46 in the cage 20 and the bottom surface 56 of the lower shoulder 48 of eth cage retainer 18. Additionally, as shown, the sealing band portion 78 is accommodated within the annular channel 50 in the cage 18.

The flange portion 76 comprises a generally flat annular disk. The sealing band portion 78 comprises first and second opposing legs 80a, 80b and a foot 82. The legs 80a, 80b meet at a peak 84 and include respective bases 86a, 86b disposed opposite the peak 84. Accordingly, the legs 80a, 80b define a generally V-shaped cross-sectional portion of the sealing band portion 78 of the sealing ring 21. The base 86a of the first leg 80a connects to the flange portion 76 of the sealing ring 21 at a flexible shoulder portion 88. The base 86b of the second leg 80b connects to the foot 82 at a flexible shoulder portion 90. So configured, the sealing band portion 78 of the sealing ring 21 is resilient and can be deformed between a relaxed state and a compressed state during operation of the control valve 10.

For example, when the valve plug 16 is in an open position (not shown), the valve plug 16 is displaced upward from the closed position such that the second perimeter surface 66b is disposed proximate to the sealing band portion 78 of the sealing ring 21. The second perimeter surface 66b is smaller in diameter than the first perimeter surface 66a, and therefore, spaced further from the internal side surface 60 of the lower shoulder 48 of the cage retainer 18, which defines the annular channel 50. The annular channel 50 thus has a larger radial dimension when the valve plug 16 is in an open position, which allows the sealing band portion 78 to assume the relaxed state, which is depicted by dashed lines in FIG. 3.

In the relaxed state, the sealing band portion 78 can be completely relaxed or can be slightly compressed due to engagement with the second perimeter surface 66b. However, the sealing band portion 78 is configured to exert no force, or a very small amount of force, against the second perimeter surface 66b. Accordingly, there is no friction, or only a very small amount of friction, between the peak 84 of the sealing band portion 78 of the sealing ring 21 and the second perimeter surface 66b. This lack of friction enables the valve plug 16 to easily move from between various open positions, each including the second perimeter surface 66b in close proximity to the sealing band portion 78. Additionally, this lack of friction increases the useful life of the sealing ring 21 by eliminating unnecessary wear on the peak 84 thereof when the valve plug 16 moves merely between open positions within the cage retainer 18 that do not require the gap 74 to be sealed, for example.

Still referring to FIG. 3, when the sealing band portion 78 is in the relaxed state, the first leg 80a is separated from the flange portion 76 of the sealing ring 21 by an angle α, the legs 80a, 80b are separated by an angle β, and the second leg 80b is separated from the foot 82 by an angle γ. The angle α can be in the range of approximately one-hundred and five degrees (105°) to approximately one-hundred and twenty-five degrees (125°), and at least in one embodiment, approximately one-hundred and fifteen degrees (115°). The angle β can be in the range of approximately one-hundred and ten degrees (110°) to approximately one-hundred and fifty degrees (150°), and at least in one embodiment, approximately one-hundred and thirty degrees (130°). The angle γ can be in the range of approximately one-hundred and forty-five degrees (145°) to approximately one-hundred and sixty-five degrees (165°), and at least in one embodiment, approximately one hundred and fifty-five degrees (155°).

During operation, the valve plug 16 moves toward the closed position (shown in FIGS. 1-3), wherein the valve plug 16 seals against the valve seat 14 and the first perimeter surface 66a is disposed proximate to the sealing band portion 78 of the sealing ring 21. As the valve plug 16 displaces downward, relative to the orientation of FIG. 3, the transition portion 66c of the external surface 66 of the valve plug 16 slides over the peak 84 of the sealing band portion 78 and begins to compress the sealing band portion 78 toward the compressed state. The compressed state is indicated with solid lines in FIG. 3 and is realized upon engagement of the peak 84 with the first perimeter surface 66a. The angled, frustoconical configuration of the transition surface 66c helps to smoothly transition the peak 84 of the sealing band portion 78 between the second perimeter surface 66b and the first perimeter surface 66a. As described above, the diameter D1 of the first perimeter surface 66a is larger than the diameter D2 of the second perimeter surface 66b. Therefore, when the valve plug 16 is in the closed position, the radial dimension of the annular channel is smaller than when the valve plug 16 is in an open position, as described above. Accordingly, the sealing band portion 78 of the sealing ring 21 assumes the compressed state.

In the compressed state, the bases 86a, 86b of the respective legs 80a, 80b, as well as the foot 82, sealingly engage the internal side surface 60 of the lower shoulder 48 of the cage retainer 18, which defines the annular channel 50. Additionally, the peak 84 of the sealing band portion 78 sealingly engages the first perimeter surface 66a of the external surface 66 of the valve plug 16. So configured, the sealing band portion 78 seals the gap 74 between the valve plug 16 and the cage retainer 18 and prevents leakage of fluid therethrough. Preferably, in the compressed state, the sealing band portion 78 applies a force to the first perimeter surface 66a of the valve plug 16 and the internal side surface 60 of the cage retainer 18 that is sufficient to prevent the pressurized fluid in the valve body 12 and the cavity 70 of the cage retainer 18 from leaking through the gap 74, even under high temperatures, e.g., greater than or equal to approximately 450° F. (232.22° C.).

In one embodiment, the sealing ring 21 can be constructed of metal such as Inconel X750 (Industry Designation N07750), 718 metal (Industry Designation N07718), or any other suitable material capable of withstanding relatively high temperatures, e.g., greater than or equal to approximately 450° F. (232.22° C.).

As illustrated, when the sealing band portion 78 is in the compressed state, the entire V-shaped cross-sectional portion deforms, i.e., flattens, such that first leg 80a is separated from the flange portion 76 by an angle α', the legs 80a, 80b are separated by an angle β', and the second leg 80b is separated from the foot 82 by an angle γ'. The angle α' can be in the range of approximately ninety-five degrees (95°) to approximately one-hundred and fifteen degrees (115°), and at least in one embodiment, approximately one-hundred and five degrees (105°). The angle β' can be in the range of approximately one-hundred and thirty degrees (130°) to approximately one-hundred and seventy degrees (170°), and at least in one embodiment, approximately one-hundred and fifty degrees (150°). The angle γ' can be in the range of approximately one-hundred and fifty-five degrees (155°) to approximately one-hundred and seventy-five degrees (175°), and at least in one embodiment, approximately one hundred and sixty-five degrees (165°).

During further operation of the control valve 10, as the valve plug 16 moves back into an open position, the valve plug 16 unseats from the valve seat 14 and moves upward, relative to the orientation of the valve body 12 in FIGS. 1-3. The peak 84 of the sealing banc portion 78 of the sealing ring 21 slides along the first perimeter surface 66a, then over the transition surface 66c. In one embodiment wherein the peak 84 maintains a slightly compressed state when the valve plug 16 is in an open position, the peak 84 finally slides along the second perimeter surface 66b. In alternative embodiments, however, where the sealing band portion 78 assumes a fully relaxed state when the valve plug 16 is in an open position, the peak 84 may not contact the second perimeter surface 66b at all.

In light of the foregoing, it should be appreciated that a control valve 10 and sealing ring 21 constructed in accordance with the embodiment described herein provides a robust fluid tight seal between a moving valve component, i.e., the valve plug 16 of the disclosed control valve 10, and a stationary valve component, i.e., the cage retainer 18 of the disclosed control valve 10, at least when the moving valve component is in a closed position. Moreover, the disclosed embodiment of the multi-contoured surface of the valve plug 16 constructed in accordance with the embodiment described herein may provide the advantage of prolonging the useful life of the sealing ring 21 by reducing and/or eliminating wear when the control valve 10 is open by reducing and/or eliminating friction between the sealing band portion 78 and the second perimeter surface of the valve plug 16.

While the sealing ring 21 has been depicted and described herein as being secured to the cage retainer 18 and the valve plug 16 has been described herein as carrying the multi-contoured surface, an alternative embodiment can include the sealing ring 21 secured to the valve plug 16, while the internal surface 37 of the cage retainer 18 can define the multi-contoured surface, similar to that which is disclosed in commonly owned U.S. Pat. No. 6,851,658, issued Feb. 8, 2005 and entitled "Control Valve Trim and Bore Seal," the entire contents of which are hereby expressly incorporated herein by reference. So configured, the sealing ring 21 would be arranged such that the flange portion 76 extends radially inwardly from the sealing band portion 78, as opposed to radially outwardly, as disclosed above. Moreover, the valve plug 16 may define an annular channel, similar to the channel 50 disclosed herein, for accommodating the sealing band portion 78 of the sealing ring 21. Further still, the valve plug 16 may be equipped with a retainer ring, or some other fastening means, that would be disposed in the annular channel, for example, for securing the flange portion to the valve plug 16.

Moreover, while the cage retainer 18 has been disclosed herein as including a two-piece clamped valve cage, the present invention is not limited to such two-piece construction. Rather, the sealing ring 21 disclosed herein can alternatively be incorporated within a control valve having a one-piece clamped valve cage, for example. With such a one-piece valve cage, the annular channel 50 could be simply formed in the internal surface 37. Additionally, such a one-piece valve cage could include a ring retainer or some other fastening means, for securing the flange portion 76 of the disclosed sealing ring 21 to the cage retainer 18.

Finally, while the generally L-shaped sealing ring 21 has been described herein as including a sealing band portion 78 with a generally V-shaped cross-section, alternative embodiments can include alternative configurations. For example, in one alternative embodiment, the sealing band portion 78 of the sealing ring 21 can include a generally linear upstanding wall with an annular bead formed on a surface thereof. The bead would be adapted to sealingly engage the external surface 66 of the valve cage 16 of the embodiment depicted herein, or alternatively, the internal surface 37 of the cage retainer 18 of the alternative embodiment described above, wherein the sealing ring 21 is secured to the valve plug 16.

Accordingly, in light of the foregoing, it should be appreciated that the control valve 10 and sealing ring 21 of the present invention is not limited to the embodiments and examples described herein, but rather, are intended to be defined by the spirit and scope of the attached claims, and any equivalents thereof.

What is claimed:

1. A fluid control device, comprising:
    a valve body having an inlet port and an outlet port;
    a valve seat disposed within the valve body defining an opening fluidly communicating between the inlet port and the outlet port;
    a valve plug having an external surface and being movable between a closed position, in which the valve plug engages the valve seat and forms a primary seal, and an open position, in which the valve plug is displaced from the valve seat;

a valve cage disposed within the valve body and having an internal surface sized to receive the valve plug, wherein a gap between the valve cage and the valve plug defines a leak path; and a sealing ring having a generally L-shaped cross-section, at least a portion of the sealing ring disposed within the gap to provide a secondary seal sealing the leak path when the valve plug is in the closed position, the sealing ring comprising a flange portion and a resilient sealing band portion, the flange portion secured to one of the valve cage and the valve plug, the resilient sealing band portion sealingly engaging the internal surface of the valve cage and an external surface of the valve plug to provide the secondary seal when the valve plug is in the closed position, wherein the sealing band portion comprises a generally v-shaped cross-sectional portion comprising a pair of opposing legs meeting at a peak, each leg comprising a base disposed on opposite sides of the peak, wherein the peak sealingly engages the external surface of the valve plug and each of the bases of the legs sealingly engage the internal surface of the valve cage.

2. The device of claim 1, wherein the flange portion is disposed generally orthogonal to the resilient sealing band portion.

3. The device of claim 1, further comprising an annular channel defined by one of the valve cage and the valve plug, the annular channel accommodating at least a portion of the sealing band portion of the seal.

4. The device of claim 1, wherein the external surface of the valve plug comprises a first perimeter surface, a second perimeter surface, and a transition surface disposed between the first perimeter surface and the second perimeter surface, the first perimeter surface comprising a first diameter and being disposed proximate the valve cage to sealingly engage the sealing ring when the valve plug is in the closed position, thereby sealing the leak path, the second perimeter surface comprising a second diameter that is smaller than the first diameter.

5. The device of claim 1, wherein the valve cage comprises a two-piece cage, the two-piece cage comprising a cage retainer and a cage frame such that the flange portion of the sealing ring is fixed between the cage retainer and the cage frame.

6. The device of claim 1, wherein the seal comprises a material suitable for operation at temperatures of at least approximately 450° F. (232.22° C.).

7. The device of claim 6, wherein the seal comprises a metal seal.

8. A fluid control device, comprising:

a valve body having an inlet port and an outlet port;

a valve seat disposed within the valve body defining an opening fluidly communicating between the inlet port and the outlet port;

a valve plug having an external surface and being movable between a closed position, in which the valve plug engages the valve seat and forms a primary seal, and an open position, in which the valve plug is displaced from the valve seat;

a valve cage disposed within the valve body and having an internal surface sized to receive the valve plug, wherein a gap between the valve cage and the valve plug defines a leak path;

a multi-contoured surface carried by one of the external surface of the valve plug and the internal surface of the valve cage, the multi-contoured surface comprising a first perimeter surface, a second perimeter surface, and a transition surface disposed between the first and second perimeter surfaces, the first perimeter surface disposed closer to the other of the external surface of the valve plug and the internal surface of the valve cage than the second perimeter surface; and a sealing ring, at least a portion of which is disposed within the gap to provide a secondary seal sealing the leak path, the sealing ring comprising a flange portion and a resilient sealing band portion, the flange portion disposed perpendicular to the axis of movement of the valve stem and secured to one of the valve cage and the valve plug, the resilient sealing band portion extending generally orthogonal to the flange portion and sealingly engaging the first perimeter surface of the multi-contoured surface to provide the secondary seal when the valve plug is in the closed position wherein the sealing band portion comprises a generally v-shaped cross-sectional portion comprising a pair of opposing legs meeting at a peak, each leg comprising a base disposed on opposite sides of the peak, wherein the peak sealingly engages the external surface of the valve plug and each of the bases of the legs sealingly engage the internal surface of the valve cage.

9. The device of claim 8, wherein the multi-contoured surface is carried by the external surface of the valve plug.

10. The device of claim 9, further comprising an annular channel defined by the valve cage and accommodating at least the sealing band portion of the sealing ring.

11. The device of claim 9, wherein the valve cage comprises a two-piece cage, the two-piece cage comprising a cage retainer and a cage frame such that the flange portion of the sealing ring is fixed between the cage retainer and the cage frame.

12. The device of claim 8, wherein the seal comprises a material suitable for operation at temperatures of at least approximately 450° F. (232.22° C.).

13. The device of claim 12, wherein the seal comprises a metal seal.

14. A fluid control device, comprising:

a valve body having an inlet port and an outlet port;

a valve seat disposed within the valve body defining an opening fluidly communicating between the inlet port and the outlet port;

a valve plug having an external surface and being movable between a closed position, in which the valve plug engages the valve seat and forms a primary seal, and an open position, in which the valve plug is displaced from the valve seat;

a valve cage disposed within the valve body and having an internal surface sized to receive the valve plug, wherein a gap between the valve cage and the valve plug defines a leak path; and a sealing ring disposed within the gap to provide a secondary seal sealing the leak path, the sealing ring comprising a flange portion and a resilient sealing band portion, the flange portion secured to the valve cage, the resilient sealing band portion comprising a generally v-shaped cross-sectional portion comprising a pair of opposing leg portions meeting at a peak, each leg portion comprising a base disposed opposite the peak, the peak sealingly engaging the external surface of the valve plug and the bases sealingly engaging the internal surface of the valve cage when the valve plug is in the closed position.

15. The device of claim 14, further comprising a multi-contoured surface carried by the external surface of the valve plug, the multi-contoured surface comprising a first perimeter surface, a second perimeter surface, and a transition surface disposed between the first and second perimeter surfaces, the first perimeter surface having a first diameter, the second perimeter surface having a second diameter that is smaller than the first diameter, the first perimeter surface sealingly engaging the peak of the resilient sealing band portion of the sealing ring when the valve plug is in the closed position.

16. The device of claim 15, further comprising an annular channel defined by the valve cage and accommodating at least the sealing band portion of the sealing ring.

17. The device of claim 15, wherein the valve cage comprises a two-piece cage, the two-piece cage comprising a cage retainer and a cage frame such that the flange portion of the sealing ring is fixed between the cage retainer and the cage frame.

18. The device of claim 15, wherein the seal comprises a material suitable for operation at temperatures of at least approximately 450° F. (232.22° C.).

19. The device of claim 15, wherein the seal comprises a metal seal.

20. A sealing ring adapted for use with a fluid control device that includes a valve body having an inlet port and an outlet port, a valve seat disposed within the valve body defining an opening fluidly communicating between the inlet port and the outlet port, a valve plug having an external surface and being movable along an axis between a closed position, in which the valve plug engages the valve seat and forms a primary seal, and an open position, in which the valve plug is displaced from the valve seat, and a valve cage disposed within the valve body and having an internal surface sized to receive the valve plug, wherein a gap between the valve cage and the valve plug defines a leak path, wherein the sealing ring is disposed within the gap to provide a secondary seal and comprises:

a body having a generally L-shaped cross-section, the body comprising a flange portion and a resilient sealing band portion, the flange portion disposed transverse to the axis of movement of the valve stem and secured to one of the valve cage and the valve plug, the resilient sealing band portion extending generally orthogonal to the flange portion and comprising a generally v-shaped cross-sectional portion comprising a pair of opposing leg portions meeting at a peak, each leg portion comprising a base disposed opposite the peak, the peak adapted to sealingly engage one of the valve cage and the valve plug and the bases adapted to sealingly engage the other of the valve cage and the valve plug when the valve plug is in the closed position.

* * * * *

UNITED STATES PATENT AND TRADEMARK OFFICE
CERTIFICATE OF CORRECTION

PATENT NO. : 7,926,784 B2
APPLICATION NO. : 11/972978
DATED : April 19, 2011
INVENTOR(S) : Leslie E. Fleming It is certified that error appears in the above-identified patent and that said Letters Patent is hereby corrected as shown below:

In the Claims:

At Column 8, line 22, "position wherein" should be
-- position,
    wherein --

Signed and Sealed this
Ninth Day of April, 2013

Teresa Stanek Rea
*Acting Director of the United States Patent and Trademark Office*